(12) United States Patent
Van Stuijvenberg et al.

(10) Patent No.: US 9,282,751 B2
(45) Date of Patent: *Mar. 15, 2016

(54) METHOD AND INSTALLATION FOR STUNNING POULTRY AND THE OBTAINABLE BLEEDED POULTRY

(75) Inventors: Wim Van Stuijvenberg, Tiel (NL); Martin Mouthaan, Zoelen (NL); Richard De Rijcke, Zoelen (NL); Twan Van Bijnen, Drunen (NL)

(73) Assignee: TOPKIP B.V., Enschede (NL)

( * ) Notice: Subject to any disclaimer, the term of this patent is extended or adjusted under 35 U.S.C. 154(b) by 494 days.

This patent is subject to a terminal disclaimer.

(21) Appl. No.: 13/320,985

(22) PCT Filed: May 20, 2010

(86) PCT No.: PCT/EP2010/003138
§ 371 (c)(1),
(2), (4) Date: Jan. 5, 2012

(87) PCT Pub. No.: WO2010/133379
PCT Pub. Date: Nov. 25, 2010

(65) Prior Publication Data
US 2012/0094002 A1    Apr. 19, 2012

(30) Foreign Application Priority Data

May 20, 2009  (EP) .................................... 09075236
May 20, 2009  (EP) .................................... 10075072

(51) Int. Cl.
  A22B 3/06    (2006.01)
  A22B 3/08    (2006.01)
  A23L 1/315   (2006.01)

(52) U.S. Cl.
CPC . *A22B 3/086* (2013.01); *A22B 3/06* (2013.01); *A23L 1/315* (2013.01)

(58) Field of Classification Search
CPC .................................. A22C 3/06; A22C 3/086
USPC .................................... 452/57, 58, 61, 62, 67
See application file for complete search history.

(56) References Cited

U.S. PATENT DOCUMENTS

| | | | |
|---|---|---|---|
| 1,410,640 A | | 3/1922 | Baker |
| 2,103,288 A | | 12/1937 | Hunt |
| 2,129,968 A | * | 9/1938 | Sargent et al. .................. 452/58 |
| 2,210,377 A | * | 8/1940 | Onorato et al. ................. 452/54 |
| 2,319,938 A | | 5/1943 | Markins |
| 2,335,993 A | * | 12/1943 | Bland et al. ..................... 452/58 |
| 2,621,362 A | * | 12/1952 | Cosden .......................... 452/53 |
| 2,861,292 A | | 11/1958 | Powers |
| 2,879,539 A | | 3/1959 | Cervin |
| 3,663,991 A | * | 5/1972 | Harben, Jr. .................... 452/118 |
| 3,724,032 A | | 4/1973 | Harben, Jr. |

(Continued)

FOREIGN PATENT DOCUMENTS

| | | |
|---|---|---|
| DE | 40 02 266 A1 | 8/1991 |
| EP | 1 935 248 A1 | 6/2008 |

(Continued)

*Primary Examiner* — David Parsley
(74) *Attorney, Agent, or Firm* — Cook Alex Ltd.

(57) ABSTRACT

The invention relates to a method and installation for stunning poultry, such as chicken, turkey, duck and quail, comprising the steps of: i) suspending the poultry with the poultry head down; ii) positioning the suspended poultry head; and iii) stunning the poultry via the suspended and positioned poultry head, and to obtainable debleeded poultry.

17 Claims, 15 Drawing Sheets

(56) References Cited

U.S. PATENT DOCUMENTS

| | | | |
|---|---|---|---|
| 3,918,123 A | 11/1975 | Harben, Jr. | |
| 3,981,045 A * | 9/1976 | Collins | 452/58 |
| 4,031,591 A * | 6/1977 | Collins | 452/60 |
| 4,092,761 A * | 6/1978 | McWhirter | 452/58 |
| 5,401,209 A * | 3/1995 | Ripol et al. | 452/58 |
| 5,487,698 A * | 1/1996 | Kettlewell et al. | 452/58 |
| 5,899,802 A * | 5/1999 | Burnett | 452/141 |
| 6,338,673 B2 | 1/2002 | Berry et al. | |
| 6,899,613 B2 * | 5/2005 | van den Nieuwelaar et al. | 452/63 |
| 2001/0044272 A1 * | 11/2001 | Berry et al. | 452/58 |

FOREIGN PATENT DOCUMENTS

| | | | |
|---|---|---|---|
| EP | 1935248 A1 * | 6/2008 | A22B 3/08 |
| WO | 00/32049 A1 | 6/2000 | |

* cited by examiner

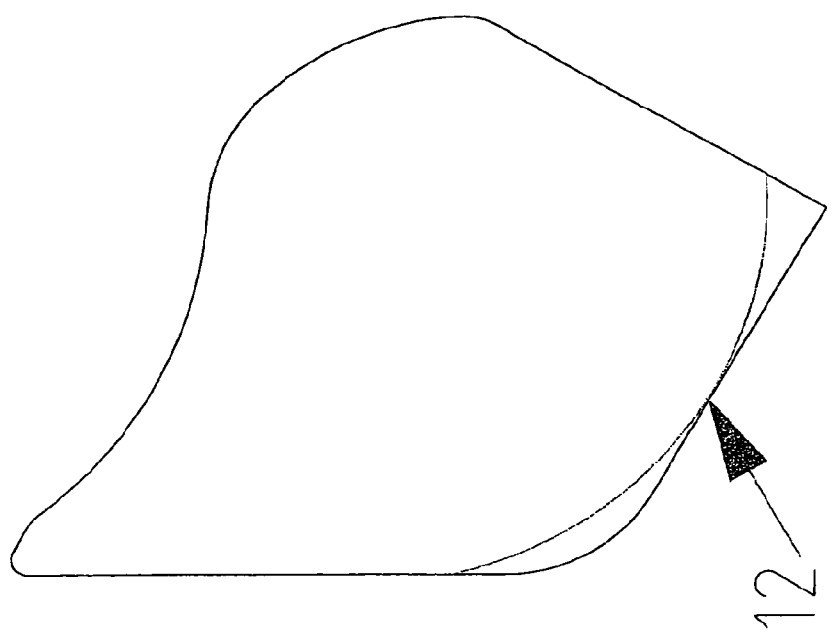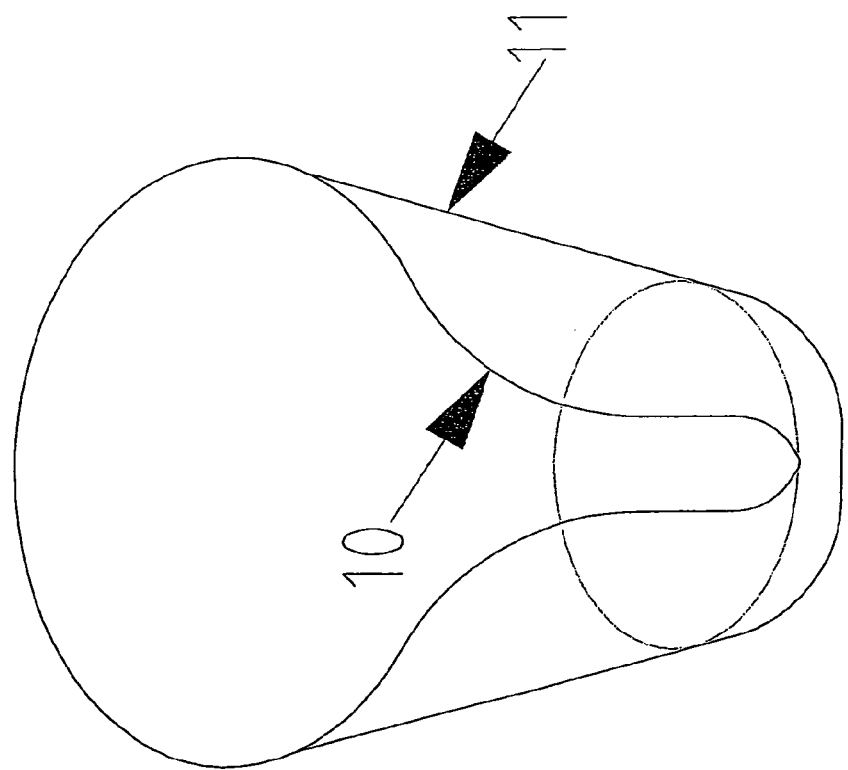
Figure 1

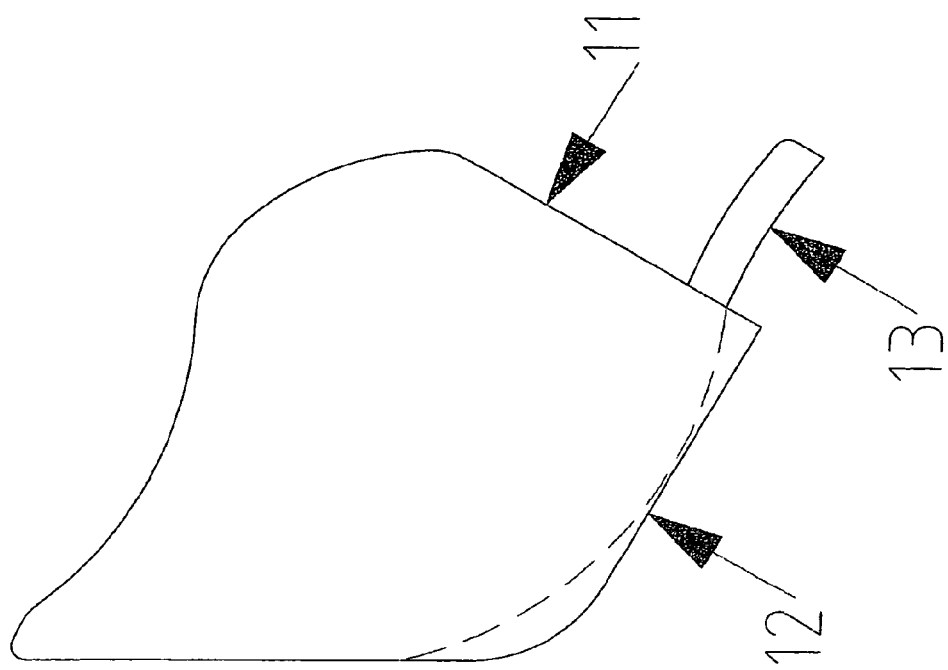
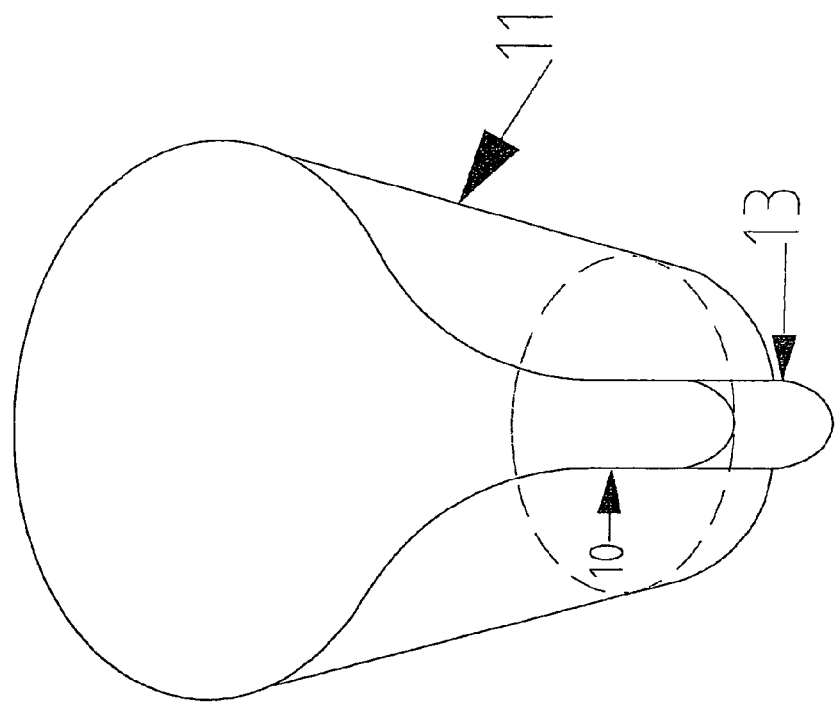
Figure 2

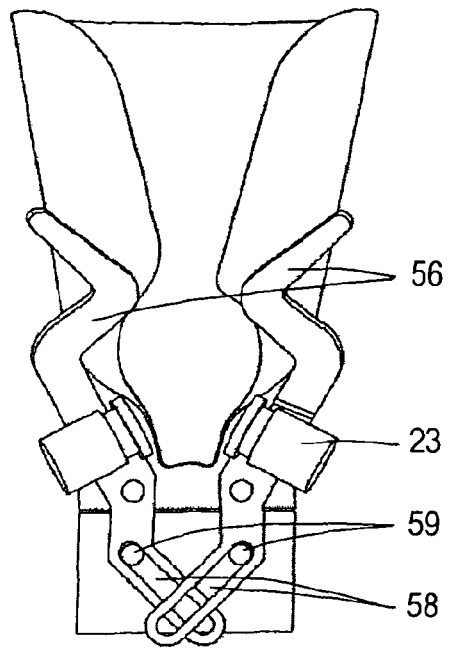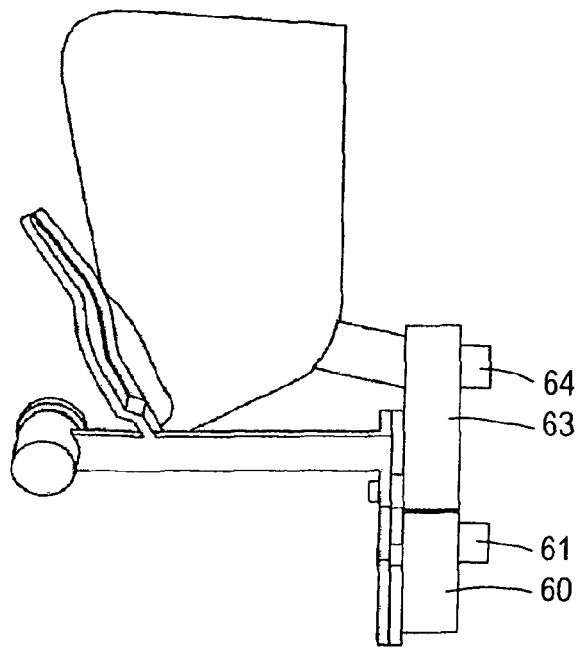
Fig.14A                Fig.14B
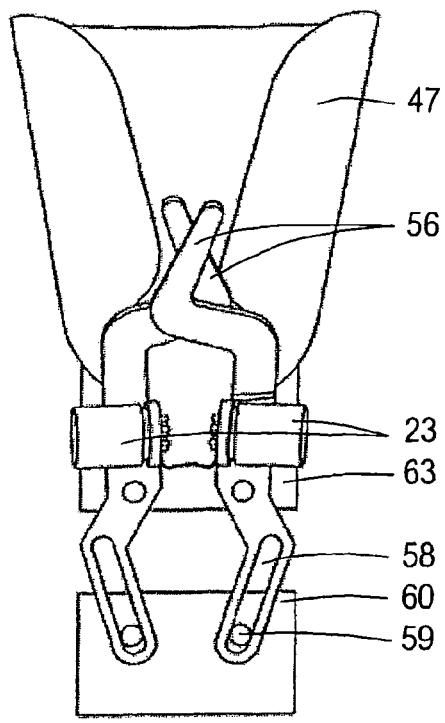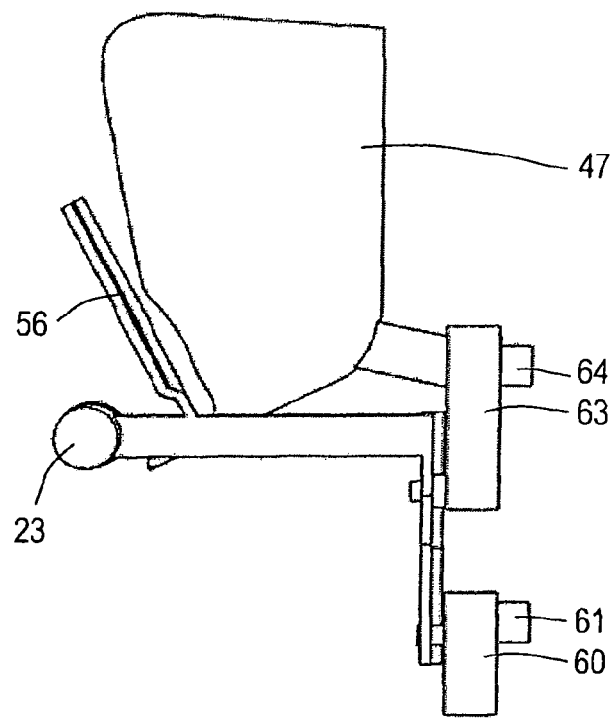
Fig.15A                Fig.15B

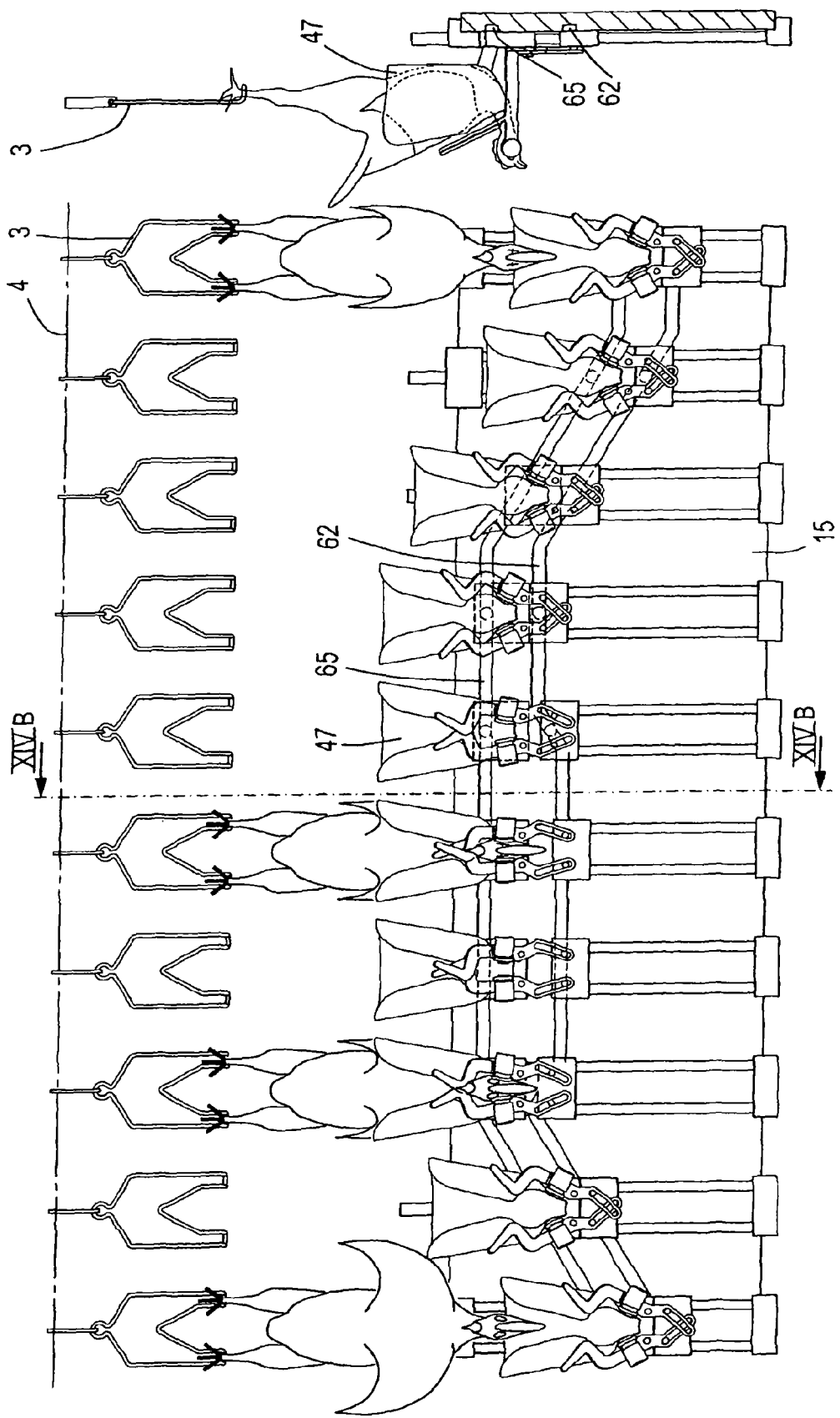

METHOD AND INSTALLATION FOR STUNNING POULTRY AND THE OBTAINABLE BLEEDED POULTRY

BACKGROUND OF THE INVENTION

1. Field of the Invention

The present invention relates to a method and to an installation for stunning poultry and to the obtainable bleeded poultry.

2. Description of the Related Art

In the process for obtaining poultry carcasses and poultry parts and meat it is of major importance that the poultry up to stunning and subsequent bleeding remain in a comfortable stage of good feeling. Stress is to be avoided as much as possible. If the poultry after being brought in a suspended position hanging downwardly from the legs, is not in a stage of good feeling and relaxation, it will be difficult if at all possible to correctly stun or anaesthetize the animal prior to bleeding after neck cutting. The animal will become stressed and will fiddle and sway around by waving with its wings. In such a situation stunning will occur in an uncontrolled manner so that there is a real risk that an animal is not stunned prior to neck cutting. This is considered an unacceptable impact on correct animal treatment and an offence of animal integrity. More and more such situations are no longer accepted by the public and often opposition is raised against such manner of animal handling by inter governmental organisations and action groups. With the result that governmental regulations become more stringent in this respect.

In addition, if poultry under stress its muscles will contract resulting in insufficient bleeding and debleeding. This will have an adverse effect on the ultimate quality of the obtained slaughtered poultry.

Legislation requires that the poultry is immediately rendered unconscious after stunning and remains unconscious until death ensues. Known methods for stunning of poultry comprise an effort to stun the poultry animal after being suspended at their legs. This stunning may comprise electro-stunning by head stunning or cloaca stunning. Electro-stunning takes place by dipping the head of the poultry into a water bath. A water bath is a legally accepted method for electro-stunning. For proper stunning is required, that each individual poultry animal receives generally a minimum of about 100 mA to 400 mA. However, it appeared that the efficacy of the stunning is highly depended on the quality of the contact between the animal and the electrodes, the number of animals present in the water bath, and the frequency and voltage applied. The differences in contact quality are such that large numbers of animals are not properly stunned before neck cutting. The result is that the use of a water bath is strongly discouraged because it is impossible to guarantee that each animal is effectively stunned for a period of time sufficient for neck cutting and correctly killing of the poultry.

Furthermore, the suspended animal may be anxious in exploring the surroundings while suspended. This means that the animal is relatively movable with head and/or wings which makes electro-stunning relatively uncontrolled and often insufficient or not effective.

SUMMARY OF THE INVENTION

It is the object of the invention to provide a method according to the invention which method avoids to a major extent the above mentioned risks and disadvantages and substantially all animals are properly stunned and remain unconscious until death comes after neck cutting. This method of the invention allows in a controlled manner stunning of poultry at a minimum risk for inappropriate or even no stunning. After stunning the poultry remains unconscious until after neck cutting and bleeding to death.

This object of the invention is obtained with a method of the present invention for stunning poultry, such as chicken, turkey, duck and quail, comprising the steps of:

i) suspending the poultry with the poultry head down;
ii) positioning the suspended poultry head; and
iii) stunning the poultry via the suspended and positioned poultry head.

According to the method according to the present invention the poultry is first animal-by-animal suspended with the poultry head down. Such suspension may conventionally be carried out by suspending the poultry with its legs from a shackle comprising shackle elements for receiving the legs of the poultry. Being suspended the poultry by nature will raise its head in order to monitor the surroundings. This allows positioning of the suspended poultry head. Such positioning of the poultry head may be accomplished by confining the neck and preferably the upper body portion of the poultry within a positioning element. This results in a positioning of the poultry head which reaches out of such positioning element confining the animal neck and preferably upper body portion. With the poultry head positioned but exposed to the outside, the poultry head may be subsequently approached by the stunning means which upon contact with the poultry head emit an electrical current into the poultry head. The electrical current is sufficient for stunning the poultry during a period of time sufficient for subsequent neck cutting and bleeding resulting in the death of the poultry animal while the poultry animal remains in an unconscious state up to death by bleeding. It is by the positioning of the poultry head that the exposed poultry head may be approached by the stunning means for in a controlled and reliable manner emit an electrical current into the poultry head.

According to a preferred embodiment the wings of the suspended poultry are also confined during the positioning of the poultry head. Such confinement may be accomplished by introducing the upper body part of the poultry into a positioning element having substantially a beaker shape. By confining the wings of the poultry the positioning of the poultry head is improved because any fiddling of the animal body by waving its wings is avoided. Fiddling is further reduced when first contact is made by the confining means with the back of the poultry. This will result in a contraction of the wings.

According to another preferred embodiment the maintenance of the poultry animal during its suspension and subsequent positioning of the poultry head in a relaxed, comfortable and non-stress state is improved once the poultry is comforted by poultry breast contact. Generally, this is accomplished by allowing contact between the poultry breast and a breast guiding plate during transport in the suspended stage of the poultry, and subsequently during positioning of the poultry head by maintaining the contact between a guiding plate and the poultry breast, and/or by allowing contact of the poultry breast with the positioning element, preferably in the form of a positioning, converging beaker.

All these measures are contemplated and used in order to maintain the suspended poultry with its positioned head in a very comfortable stage without stress thereby minimizing any movement of the animal head, wings or other poultry body parts up to contact with the stunning means and bringing the animal in an unconscious stage by the stunning.

The stunning is preferably carried out by electro-stunning. Electro-stunning means that sufficient electrical power (dependent on current and voltage) is applied to the animal with the result that the animal is stunned and becomes unconscious. Electro-stunning may be carried out by using two electrodes making contact at distance with the animal head in order to allow for head-head stunning. Another option is to have one electrode making contact with the head and the other electrode making contact with the animal leg or legs. This is so-called head-leg-stunning. A further option is head-cloaca stunning in which case one electrode contacts the head and the other electrode contacts the cloaca. Of all three electro-stunning options the head-head electro-stunning is preferred because of the minimum distance in between the electrodes thereby allowing a precise and controlled electro stunning of in particular brain tissue. Furthermore, the electrical density is highest and no aberrations will occur by leaking electrical current to other body parts or via other body parts to the installation.

Optimal stunning for a predetermined period of time is obtained if preferably the head resistance of the poultry is measured and dependent on the measured resistance electrical current is applied, such as 100-400 mA, preferably 150-300 mA, and in particular 240 mA in view of European legislation.

In order to improve the electrical contact between the electrodes and the poultry, it is preferred that the poultry is wetted prior to electro-stunning. In case of head-head stunning it is preferred that the poultry head is wetted by nebulising water droplets on the poultry head at least at the locations where the stunning electrode(s) will make contact with the poultry head.

According to the method of the present invention it will be to a very high degree if not fully certain that each individual poultry animal will become unconscious after stunning and remains unconscious up to neck cutting for bleeding and subsequently bleeding to death.

Another aspect of the present invention relates to an installation for stunning poultry, such as chicken, turkey, duck and quail, comprising:
  i) means for suspending the poultry with the poultry head down;
  ii) means for positioning the suspended poultry head; and
  iii) means for stunning the poultry via the suspended and positioned poultry head.

As indicated before the installation according to the present invention comprises means for suspending the poultry. The means for suspension of the poultry by hanging at its legs is a traditional poultry transportation device comprising shackles which comprise receiving elements for the poultry legs to be suspended. The position means for the poultry head are mounted and arranged such that the poultry head has a low degree of freedom after positioning and is generally in a very well controlled position which position is subsequently approached by the stunning means. The stunning means comprise at least one stunning electrode for applying an electrical current through the animal sufficient for stunning and making the animal unconscious.

According to a preferred embodiment an installation wherein the positioning means comprise a V-shaped positioning element for accommodating the neck of the poultry, and preferably the V-shaped positioning element is incorporated in a beaker, preferably a downwardly converging beaker. The positioning means comprise a positioning element which has a V-shaped positioning element in which the neck of the suspended poultry is inserted. Accordingly the poultry head reaches out of this V-shaped positioning element to one side whereas its body remains at the other side of the V-shaped positioning element. This brings the poultry head in a well-controlled position in relation to the stunning installation.

According to a preferred embodiment, the V-shaped positioning element is incorporated in a beaker in which will be accommodated the neck and upper body portion of the poultry with the head extending via the V-shaped positioning element outside the beaker. When the beaker is converging downwardly, this will result in a well-controlled confining of the animal, because the animal will be more intimately accommodated in the beaker while freely extending its poultry head out of the beaker. The head is with comfort hold in the desired position if preferably the V-shaped positioning element opens into a positioning throat confinement. The head appreciates resistance when moving upward but feels comfort in the wider throat confinement. According to a further preferred embodiment, the V-shaped positioning element is provided with a supporting element onto which the part of the neck which is extending out of the V-shaped positioning element may rest which further improves the positioning of the poultry head and increases the comfort of the poultry while being positioned. It is furthermore preferred when positioning arms hold the positioned head in place during for instance resistance measurement, wetting and/or stunning.

As indicated herein before, the stunning means preferably have the form of electro-stunning means for head-head stunning, head-leg stunning and/or head-cloaca stunning. In case of head-head stunning two electrodes will make contact with the head of the animal prior to emitting the electric current into the head. In case of head-leg stunning one electrode is contacting the head and the other electrode is connected to at least one leg and preferably to both legs. In the latter case the electrode is formed by the shackle. The shackle is electrically connected to the transportation chain forming the negative electrode. In case of head-cloaca stunning the other electrode is contacting the cloaca. Preferably, the stunning means comprise means for measuring the head resistance and means for adjusting the electrical power dependent on the measured head resistance, wherein preferably the electrode comprises electrode pins which are preferably ejectable form an electrode surface, when the surface is pressed against the poultry head.

According to a preferred embodiment of head-head stunning comprise the stunning means two electrodes to be placed against the head of the poultry, and carrying each a spring loaded electrode surface, preferably provided with electrode pins. This allows for an optimal contact with the poultry. Preferably the shape of the electrode surface is adjusted to the form and shape of the poultry head and has a rounded rear portion and a diverging front portion. Making it possible for optimal head contact even when the poultry has raised its head to some extent.

By measuring the resistance (or conductivity) optimal stunning is possible for each individual poultry. At highest conductivity it is generally possible to use less electrical power while still reaching the unconscious stage of the animal during a sufficient period of time. In such a case it is preferred that the installation comprises means for determining the electro-conductivity of each individual poultry head just before electro-stunning. This provides for an opportunity for improving the electro-conductivity if by measurement the electro-conductivity appears to be insufficiently low or to avoid that the stunned animal becomes conscious before neck cutting. In such a case that it is preferred that the installation comprises wetting means for wetting the head or possible leg and/or cloaca before contact is made with the electrode for electro-stunning. This wetting may be accomplished by water-dipping. However, it is preferred that wetting results from emitting a water droplet mist or water droplet spray from a nebuliser or sprayer which emits the water droplets towards and onto the respective sides on the animal head or other body part prior to electro-stunning.

The method according to the invention requires several steps prior to stunning. These steps comprise suspension, positioning and application of the stunning means prior to electro-stunning. In order to have these three steps carried out in a synchronized manner, it is preferred that the suspension means, position means and stunning means are incorporated in transport means which allow mutual synchronization. This is practically carried out by using a transportation means, such as in the form of one or more chains, to which make contact the suspension means, the means for positioning the V-shaped position element in relation to the animal body, and finally the stunning means or stunning electrodes. When the positioning means and stunning means are incorporated in one transportation vehicle which is connected to the transportation chain or chains also connected with the suspension means, then a very practical and reliable manner synchronization of the various means according to the invention is accomplished.

Finally, having the animal brought and maintained in a stunned and unconscious state, it is preferred that after retraction of the stunning means, the exposed part of the animal neck is then cut for bleeding. This bleeding will occur with the animal not being in a stressed state, so that bleeding is optimal with limited or even substantially no muscle contraction and withholding of bleed in the dead animal. Accordingly, the carcass eventually obtained is of better quality. Accordingly the debleeded poultry has improved properties in relation to the degree of bleeding and in relation to the quality of the poultry meat in comparison to poultry which was not sufficiently handled and stunned prior to neck cutting.

Thus, a last aspect of the invention relates to the debleeded poultry obtained with the method according to the invention as disclosed herein before.

Mentioned and other features of the method, installation, and debleeded poultry according to the invention will be further illustrated by several embodiments which are given for information purposes only and are not intended to limit the invention to any extent. In relation to these embodiments reference will be made to the annexed figures of which:

BRIEF DESCRIPTION OF THE DRAWINGS

FIG. 1 is a front view of a beaker comprising a V-shaped positioning element according to the invention;

FIG. 2 is a side view of the beaker of FIG. 1;

FIGS. 14A, 14B, 15A, and 15B are front and side views of the working of the alternative electrode in combination with positioning arms according to the invention;

FIGS. 16A and 16B are front and side views according to line XIV-B-XIV-B in FIG. 16A of a stunning installation according to the invention.

DETAILED DESCRIPTION OF THE PREFERRED EMBODIMENTS

Figure 3:
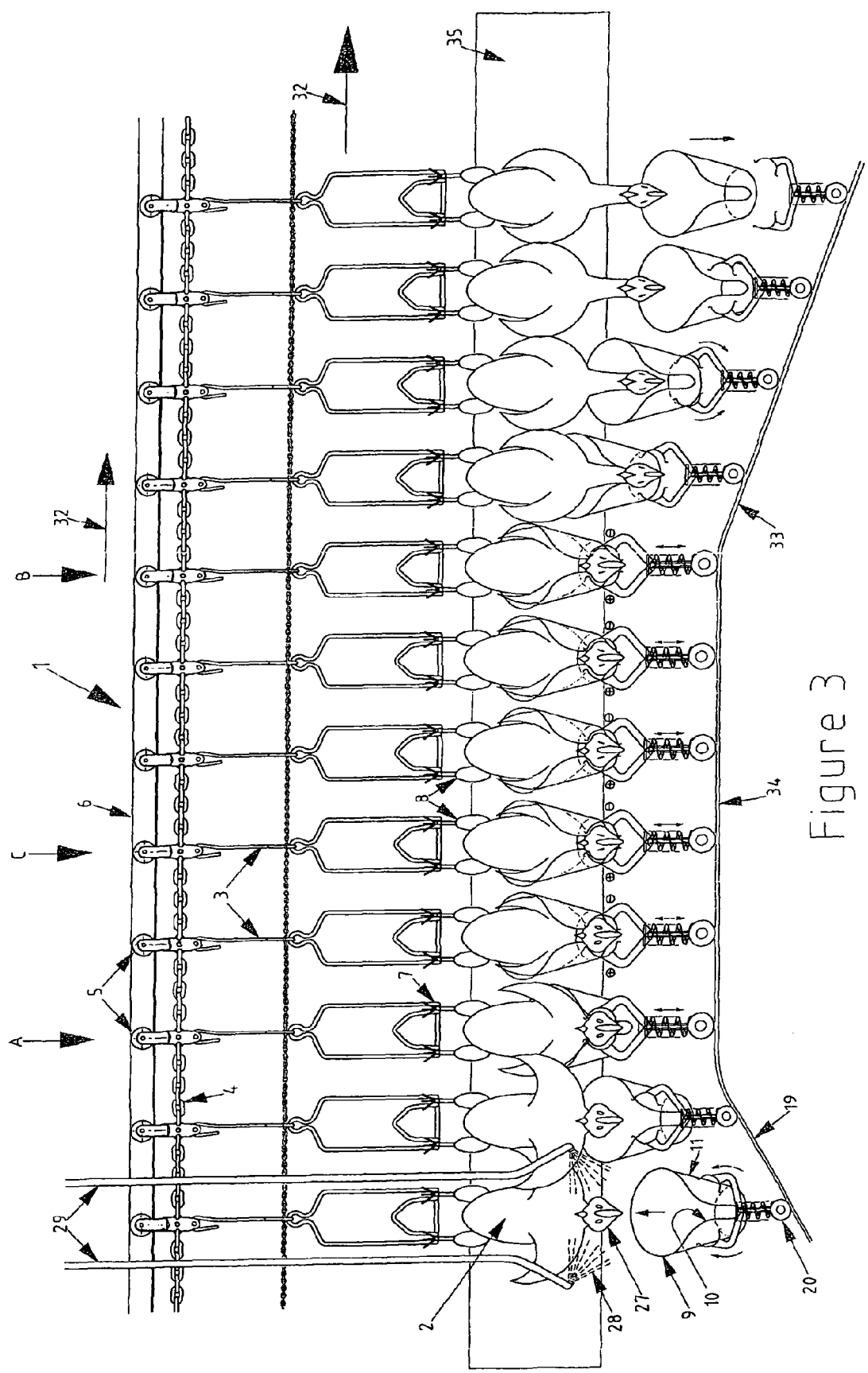
FIG. 3 is a front view of an installation according to the invention.

FIG. 3 shows an installation 1 for stunning poultry 2, in this case chicken. The installation 1 comprises shackles 3 connected to a chain 4 connected and via rollers 5 to a transport bar 6.

The shackles 3 comprise U-shaped receiving elements 7 for receiving the legs 8 of the poultry 2.

The installation 1 comprises further positioning means 9 in the form of a V-shaped positioning element 10 incorporated in a beaker 11 which is converging downwardly.

FIG. 1 shows a first embodiment of the beaker 11 with the V-shaped element or slot 10. The beaker has a bottom 12 which is in a slanted position. The form of the beaker 11, in particular the upper opening and the bottom 12 and the V-shaped slotted element 10 are such that the neck and the upper body portion and wings of the poultry 2 are comfortably and gently received and confined. In particular such that the breast of the poultry makes contact with the beaker 11 wall so that the poultry is subjected to a comfort providing sensation by wall contact.

FIG. 2 shows an alternative to the beaker 11. In this case the beaker 11 is provided with a supporting element 13 extending outwardly from the lower region of the slotted element 10. The dimensions of the supporting element 13 are such that the part of the poultry neck that is extending out of the beaker 11 is supported thereby providing still more comfort to the suspended poultry animal.

Figure 4:
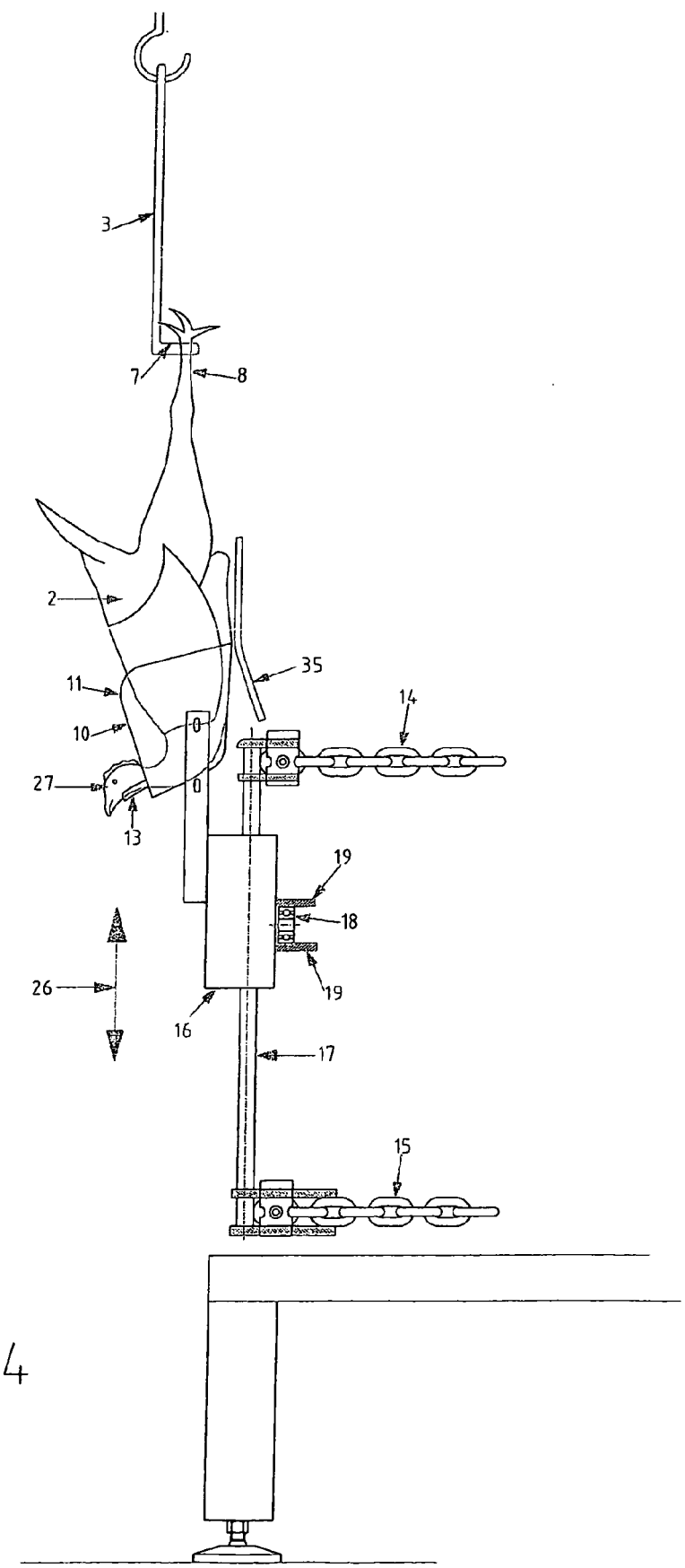
FIG. 4 is a side view of a part of the installation shown in FIG. 3.
Figure 5:
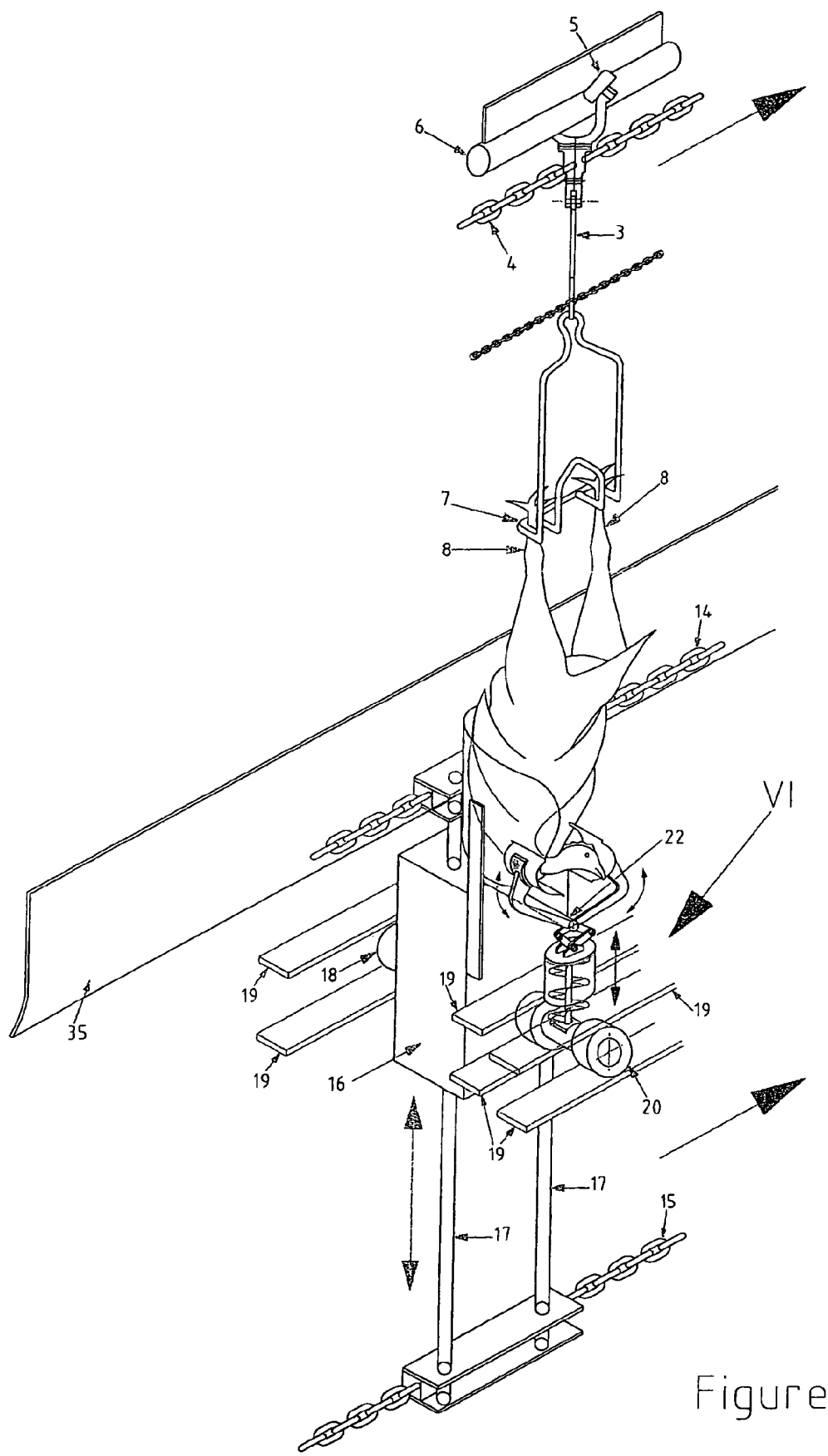
FIG. 5 is a perspective view of the position shown in FIG. 4.

As shown in FIG. 4, the beaker 11 is carried by a slide block 16 which is slidable over two parallel bars 17 connected to two chains 14 and 15 which are part of the transportation means also comprising the chain 4. The slide block 16 slides over the bars 17 under the action of a rider 18 rolling over and between two pairs of rider strips 19 via the rider wheels 20.

Figure 6:
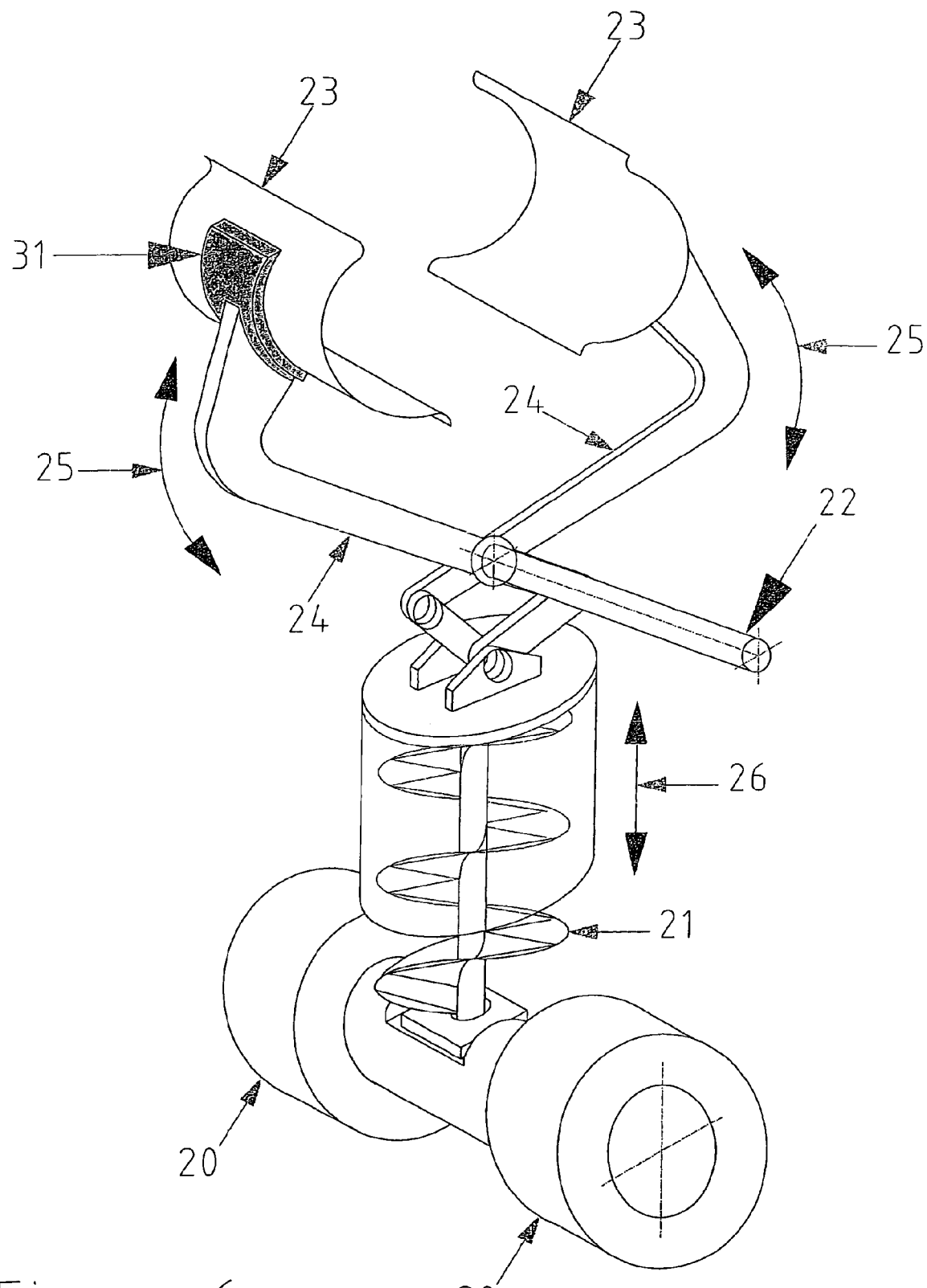
FIG. 6 is a larger scale detail VI of FIG. 5.

As shown in more detail in FIG. 6, the rider wheels 20 are connected via a spring to an support axle 22 to which are connected the stunning means 22 carried by a lever 24. The support axle 22 is connected to the slide block 16. Thus, when the rider wheels 20 roll over the strips 19 such that the distance between the wheels 20 and the support axle 22 changes, the two levers 24 will be forced to move according to the arrows 25. More precisely, when the distance between the wheels 20 and axle support 22 is reduced according to arrow 26, the stunning means 23 move towards one another according the arrow 25. The distance is changed as is shown in FIG. 3. In position A the stunning means 23 have made contact to the head 27 of the poultry 2.

Returning to FIG. 3, it is shown that the poultry 2 suspended from the shackle 3 is first exposed to a water spray 28 emitted from spray tubes 29. Accordingly, the head 27 is wetted and thereby providing for each poultry head substantially the same electro-conductivity.

The transportation chains 4, 14 and 15 move in a synchronized manner the shackles 3 and the beakers 11 towards position A. The wheels 20 roll over and between the strips 19 which are having an inclined form so that the beaker 11 moves towards the suspended chicken 2 whereby the upper body and wings of the chicken 2 are received and confined in the beaker 11 with the head 27 extending through the V-shaped positioning element 10 with part of the neck. As a result, accommodation of the neck of the chicken 2 in the V-shaped positioning element 10 takes place by relative vertical movement between the shackle 3 in which the chicken 2 is suspended head down and the V-shaped positioning element 10. Moving towards position A the electrode blades 30 of the stunning means 23 make contact with the positioned wetted head 27 of the poultry. The electrode blades 30 are connected via non-shown electrode cables to a source for electrode power. The blades 30 are connected to the levers 24 via an insulation block 31.

In position C in FIG. 3 a controlled amount of electrical power is emitted from the electrode blades 30 into the head of the chicken 2 which is thereby stunned.

In the meanwhile the transportation means transport further following the arrow 32. The wheels 20 follow the declined part 33 of the strips 19 so that the electrode blades 30 are removed from the unconscious head of the chicken and the beaker is retracted. The horizontal part 34 of the strips 19 is such that during transportation time is available for contacting with the electrode blades 30 with the head 27 of the chicken for electro-stunning, and if required also for neck cutting while having the head and the neck of the unconscious chicken in a well-positioned state. Due to the head-head electro-stunning using two electrode blades 30 the control of the applied electrical power, voltage and current is such that in a well-controlled manner via the positioned poultry head electro-stunning is effected and the risk for insufficient stunning is almost reduced to zero.

Figure 7:
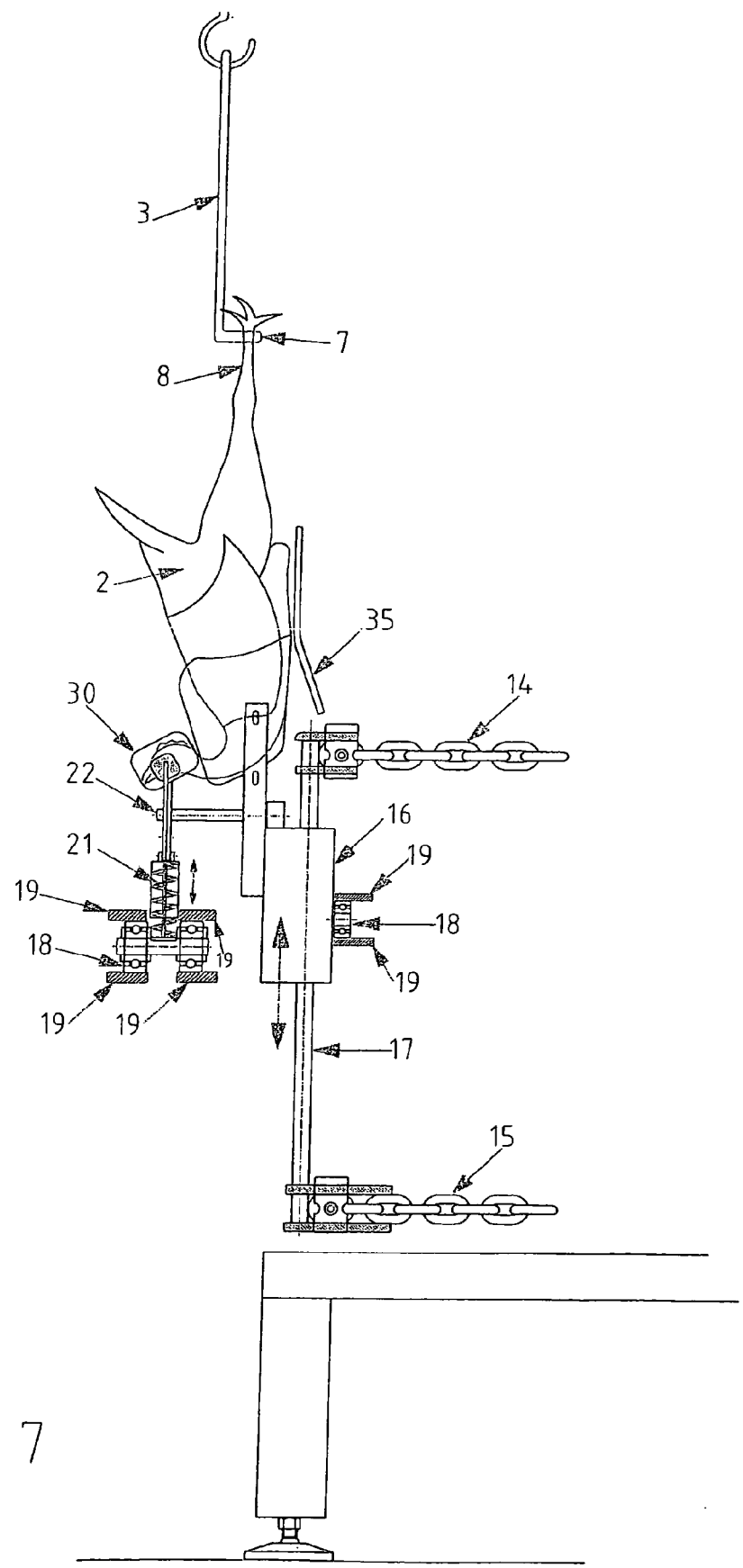
FIG. 7 is a side view of position B in FIG. 3.

Finally FIG. 7 shows for the installation 1, that the slide block 16 is comprising a separate rider 36 running over strips 37 which follow the same path as the strips 19. The slide block 16 and the riders 18 are connected to the same transportation chains 14 and 15 so that their movements are synchronized. FIG. 7 shows further that the breast of the chicken 2 first made contact with the breast guiding plate 35 during transportation into position A shown in FIG. 3. In approach of position A the beaker 11 moves upwardly and confines the upper body portion of the chicken 2 and during this upward movement the chicken breast makes contact with the beaker wall thereby taking over the function of the breast guiding plate 35.

Figure 8:
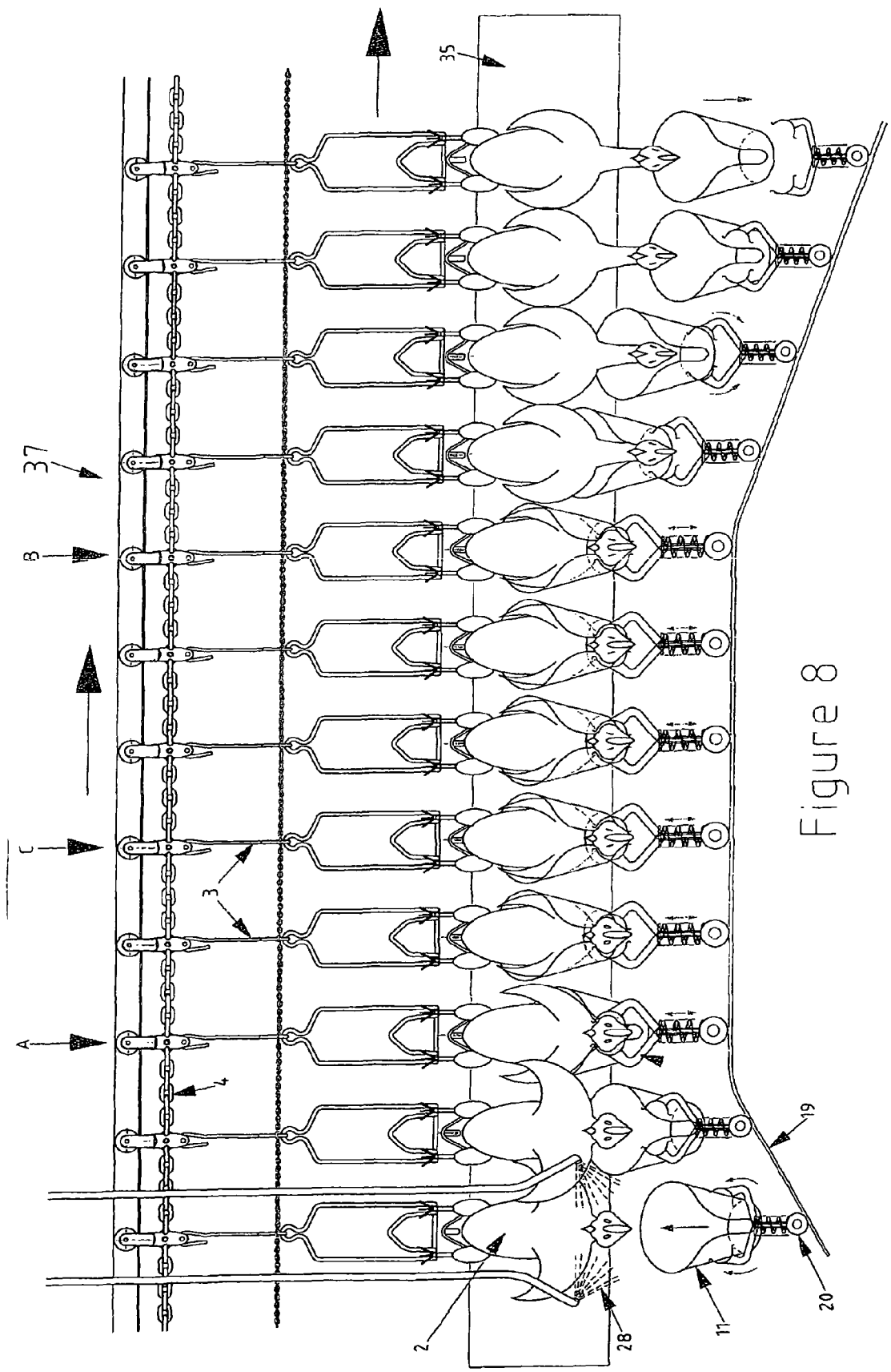
FIG. 8 shows a front view according to FIG. 3 of another embodiment of the installation and method according to the present invention.

FIG. 8 shows another installation 37 according to the invention for stunning poultry. Insofar FIG. 8 the same structural elements are used the same reference numbers and letters are used. In FIG. 8 electro-stunning takes place by so-called head-cloaca stunning. This means that in position C in FIG. 8 the head is enclosed in between two blades 38 and 39 of which in principal only one blade 38 forms the negative or positive electrode. Via an electrical connection (not shown) the blade 38 is connected to a power supply. In case of the negative electrode, the blade is electrically isolated and thereto connected via electrical insulation 47 to the lever 24 (see FIG. 11).

Figure 9:
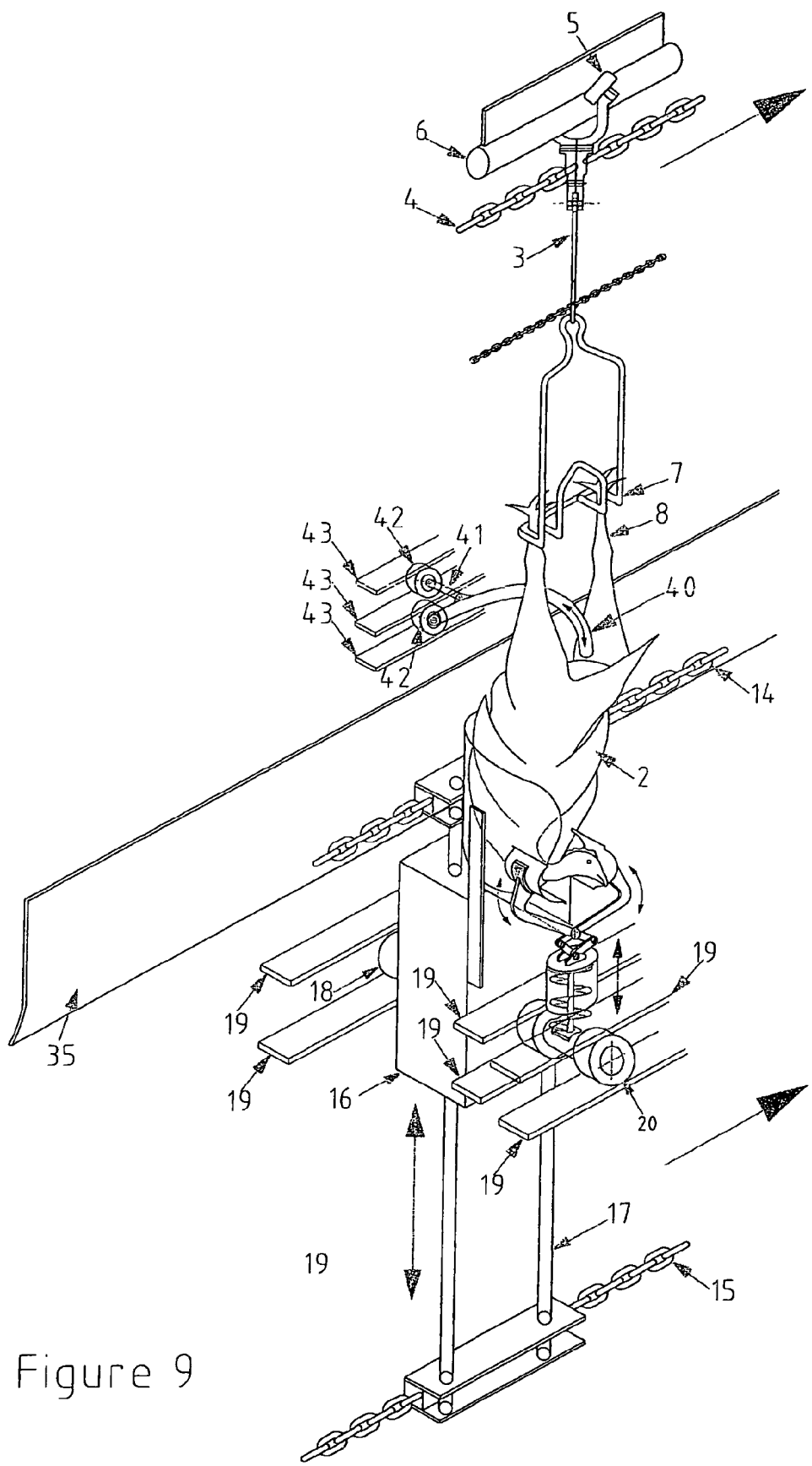
FIG. 9 is a perspective view as in FIG. 5 of the installation of FIG. 8 using head-cloaca stunning.

The other electrode 40 is an electrode bar 40 which is to be connected to the cloaca of the chicken 2. The electrode bar 40 is connected to a rider 41 of which wheels 42 are guided by strips 43. The rider 41 (FIG. 9) is connected (not shown) to the transportation chains 14/15 for synchronization purposes.

Figure 10:
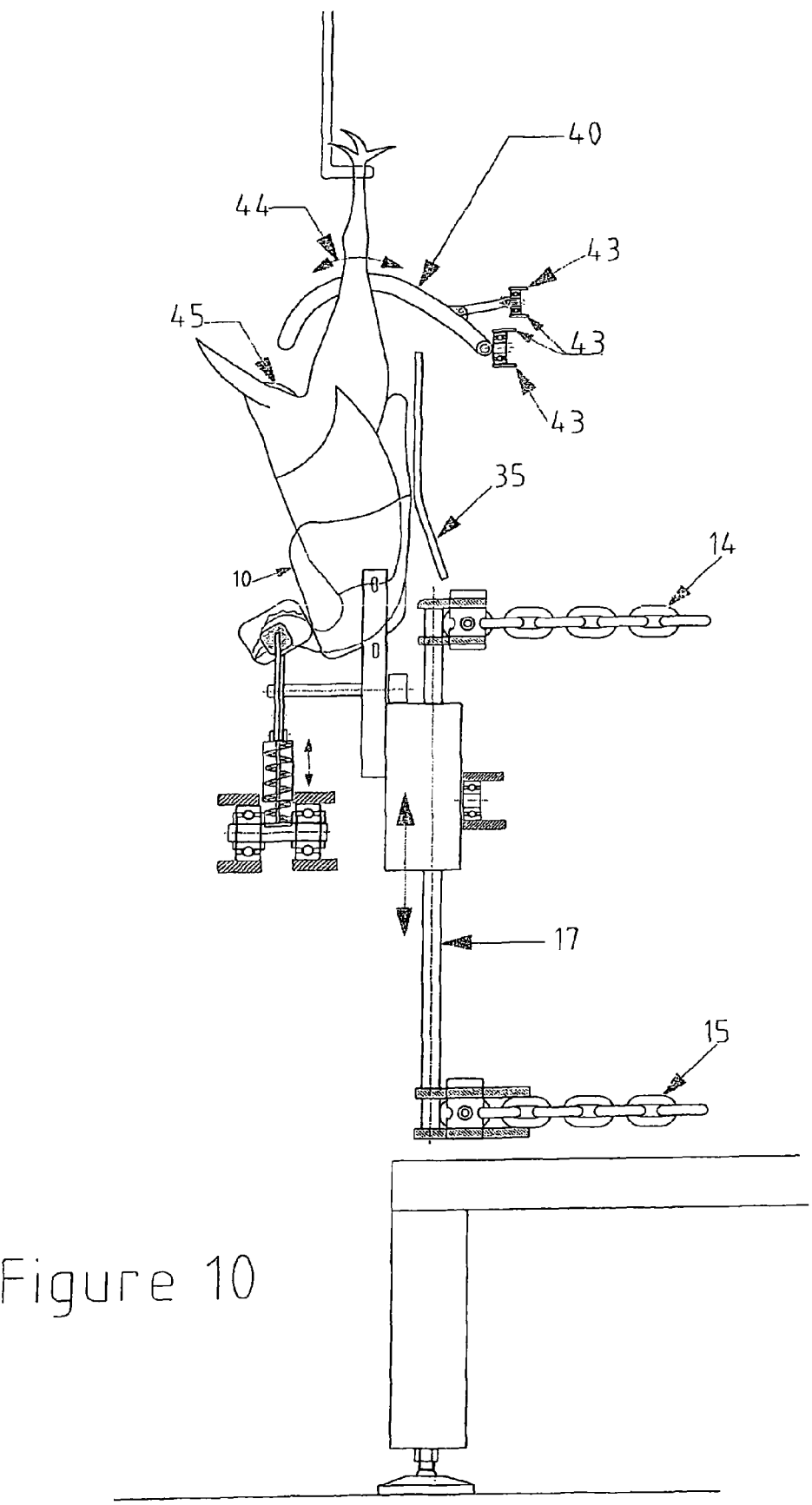
FIG. 10 is a side view of FIG. 9.

As shown in FIG. 10 the strips 43 are formed such that the electrode bar 40 can reciprocate according to arrow 44 thereby making contact with the cloaca 45.

Figure 11:
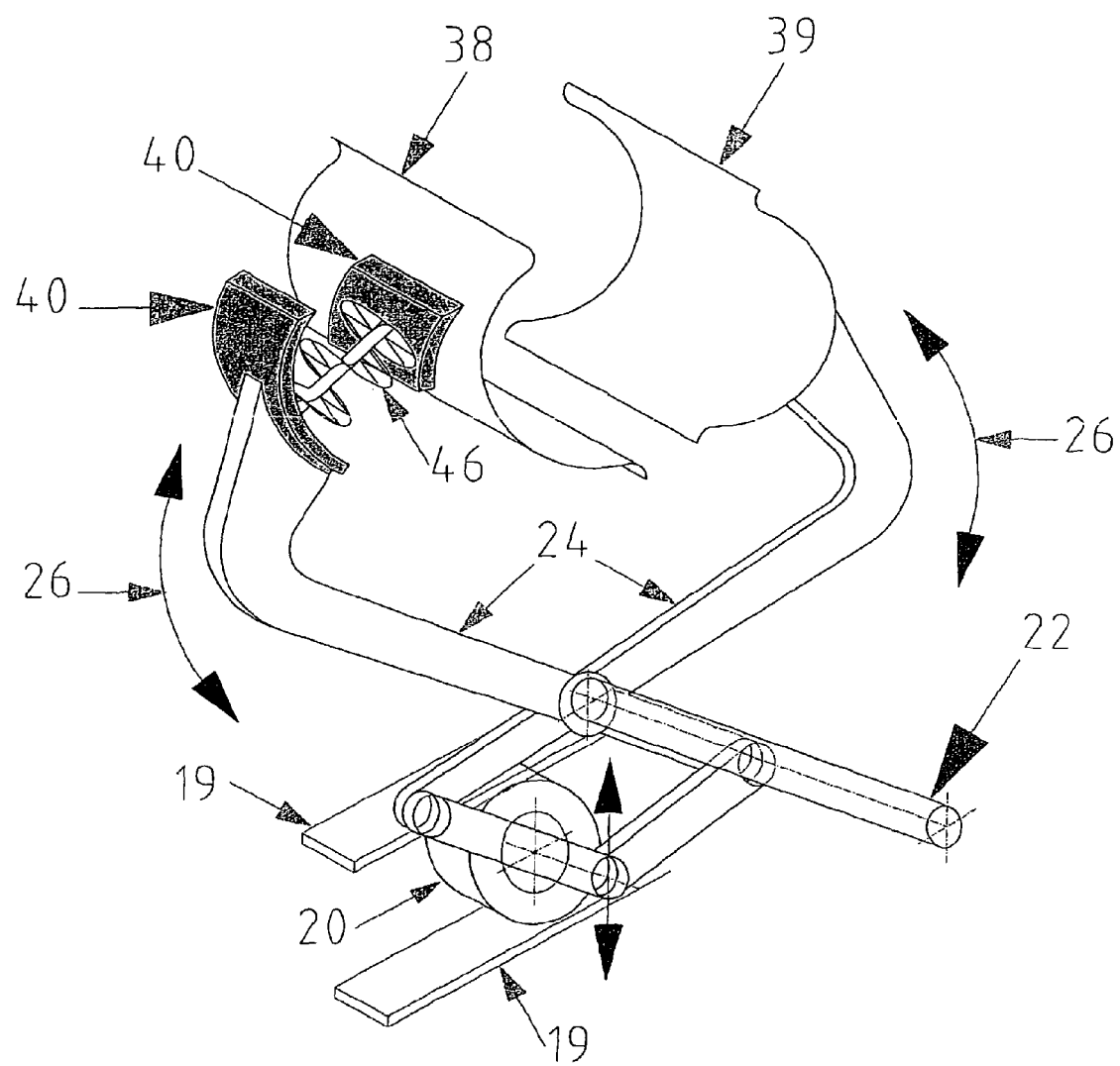
FIG. 11 is a larger scale side view of another embodiment of electro-stunning means according to the invention.

With reference to FIG. 11, it is shown that the levers 24 are directly connected to the support axle 22 so that their movement is directly following the movement of the wheel 20 over the strips 19. Adjustment of the blades 38 and 39 in relation to the positioned head of the chicken is possible due to the insertion of a spring 46 between the insulation 47.

Figure 12A:
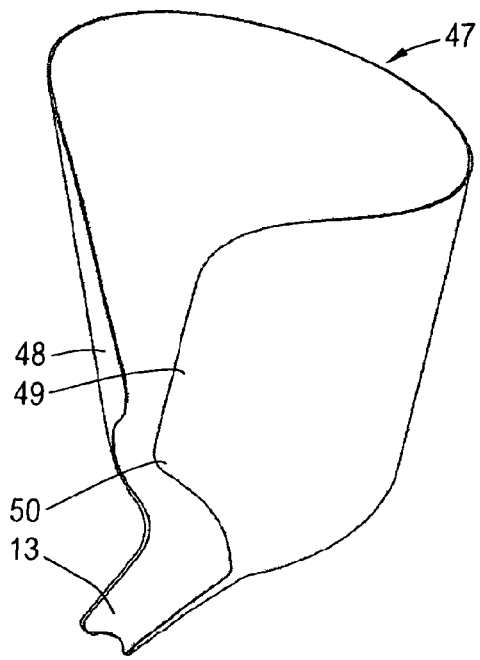
FIGS. 12A and 12B are perspective views of alternative positionings of a beaker according to the invention.
Figure 12B:
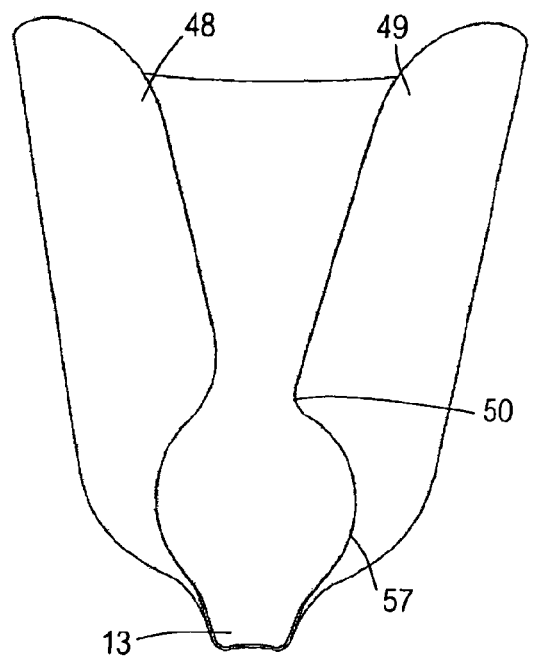

FIGS. 12A and 12B show a positioning beaker 47 having two beaker walls 48 and 49 extending outwardly, so that when confining the poultry the back side is contacted first resulting in a contraction of the wings. The V-shaped element 10 is generally hour-glass shaped and comprises beneath a restriction 50 a throat holding confinement 51. Accordingly, the poultry head appreciates resistance when moving upwardly.

Figure 13A:
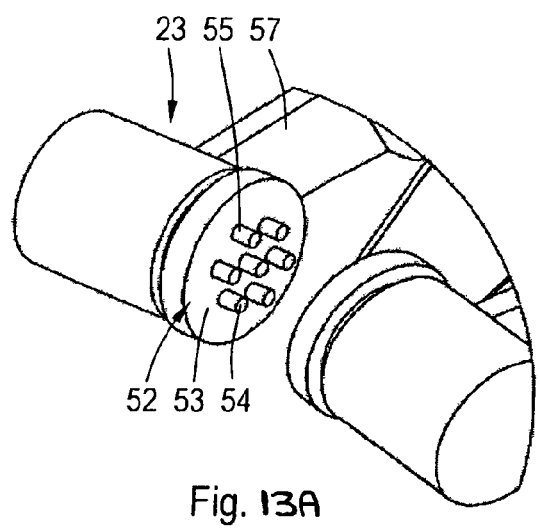
FIGS. 13A and 13B are perspective views of alternative stunning electrodes according to the invention.
Figure 13B:
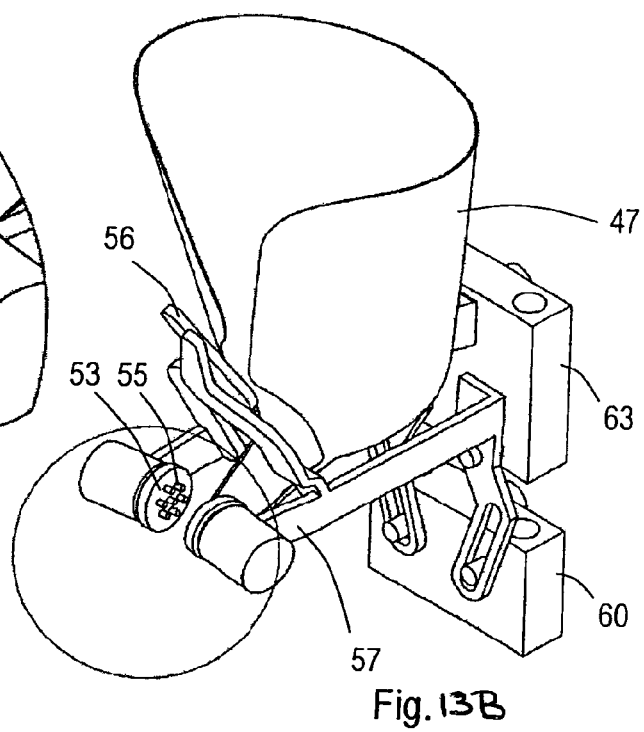

FIGS. 13A and 13B show an alternative for the electrodes 23. The electrode 52 has the form of a head surface 53 comprising holes 54 through which electrode pins 55 may extend, when the head surface 53 is presses against spring force on the poultry head. This pins 55 penetrate trough the feathers and make optimal contact with the poultry skin. Via these pins the conductivity is measured. Dependent on the measured conductivity the poultry is stunned with an adapted electrical power in the form of electrical current, such as about 240 mA. Thus differences in contact are compensated for by adjusting the electrical current when stunning. The stunned poultry becomes unconscious for a period of time sufficient for the following neck cutting.

The electrodes 52 and positioning arms 56 are mounted on bars 57 which are connected via lever slots 58 and lever pins 59 to a guiding block 60 of which guiding pins 61 follow guiding curve 62 on the installation 1. At the same time follow a pin 64 of the block 63 carrying the beaker 46 also a curve 65. Both curves 62 and 65 determine the relative position of the beaker 47, the stunning means 23 and the position of the poultry 2. For clarity reasons the electrical leads to the electrodes and the leads for measuring the resistances and in dependence providing the electrodes with a processor are not shown as they are conventional means but not used in combination in the installation of the invention.

In addition, FIGS. 16A and 16B show the operation of the installation 1 with the alternative beaker and stunning and position means.

Figure 17A:
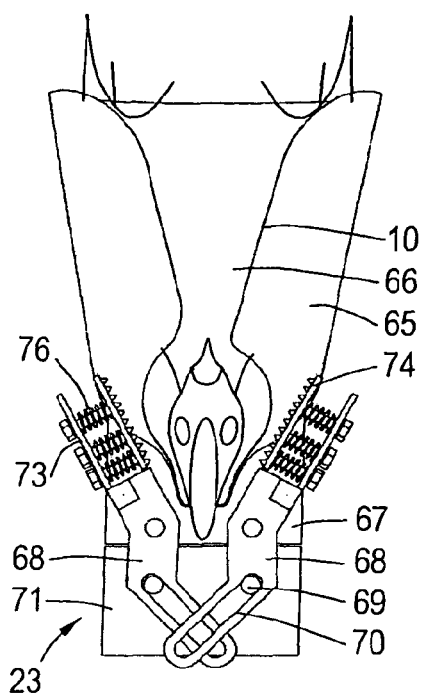
FIGS. 17A, 17B, 18A, and 18B are front and perspective views of alternative stunning electrodes in open and closed (stunning) position, respectively, according to the invention.
Figure 17B:
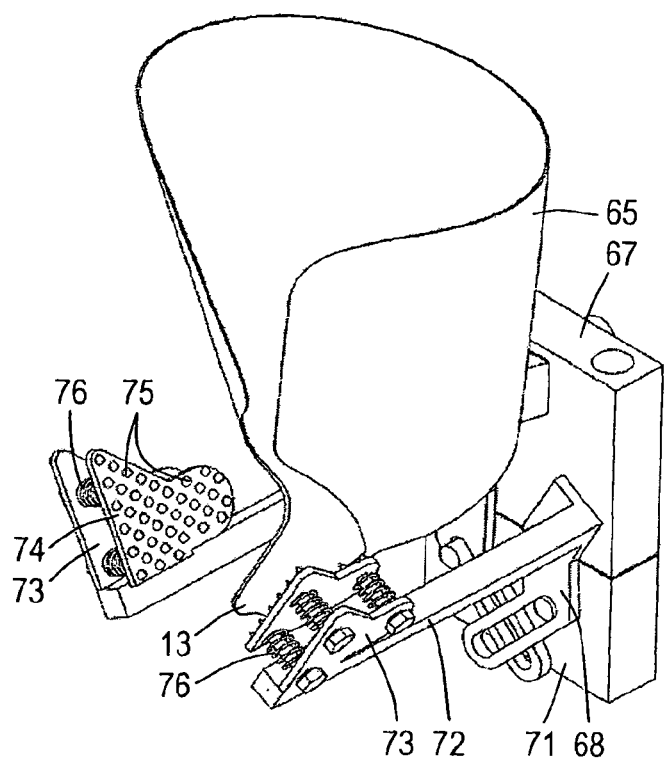
Figure 18A:
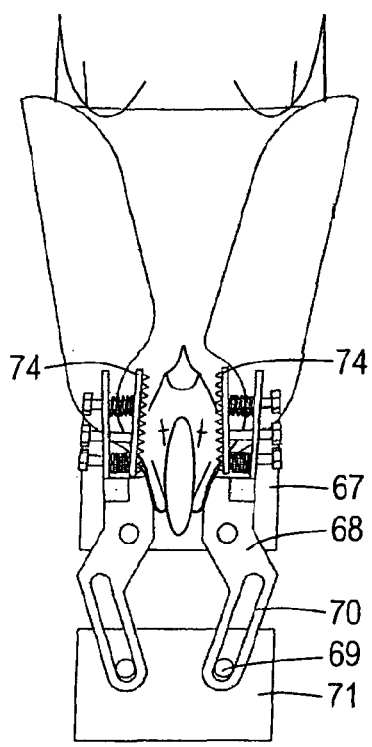

FIGS. 17 and 18 show another embodiment of the stunning means 23 for head-head stunning. A beaker 65 has received and confines a chicken 66. The chicken head is positioned in the V-shaped slot 10 and rests with its neck on a supporting element 13. The beaker 65 is supported by a block 67 also carrying pivotally the bars 68. The bars 68 have a slot 70 guiding a pin 69 mounted on the block 71. Thus, when the block 71 is moved downwardly and away form the block 67, the stunning means 23 close round the chicken head, see FIGS. 17A, 17B, and 18A. The stunning means 23 comprise a support bar 72 having a support plate 73. The plate 73 carries a with springs 76 loaded electrode plate 74 provided over its surface with electrode pins 75. Not shown are the electrical connections and the means for measuring the head resistance for determining the electric current to be applied for stunning the poultry for about 10 sec to 2 min (about 120 to 240 mA).

Figure 18B:
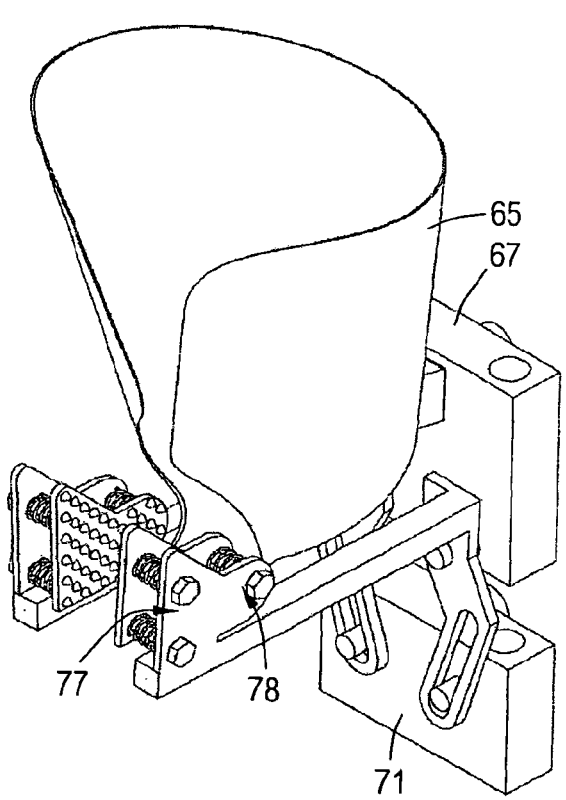

As shown in FIGS. 18A and 18B is the head of the poultry sandwiched between the two electrode plates 74 which take a slightly inclined position as they conform to the shape of the head of the poultry. The plates 74 have a rear portion 78 rounded of in shape, and have a diverging front portion 77 adapted to the head of the poultry. The form also compensates for the differences in sizes of the poultry and different positions of the head with caught in between the electrode plates 74.

Having read the full description of both installations 1 and 37 according to the invention, the skilled person will appreciate, that by positioning the neck of the suspended poultry in the V-shaped positioning element which could be incorporated in the beaker 11, the head of the suspended poultry is positioned but still approachable for the stunning means. The movement of the beaker stunning means and suspending means is synchronized such that in a gentle manner the suspended poultry, such a chicken, feels comfortable up to the enclosure by the electro-stunning means and the application of electrical power via the stunning means. All takes place in a controlled and well-defined manner such that electro-stunning is carried out in a reliable manner so that each individual poultry element is electrically stunned and the animal remains unconscious until after neck cutting and bleeding to death. This way the animal appreciates hardly any invasive or scaring action or movement up to made unconscious by electro-stunning.

The invention claimed is:

1. A method for stunning living poultry, comprising:
   (i) suspending the living poultry to provide suspended living poultry in a downwardly suspended position with the head positioned downwardly and the legs extending upwardly;
   (ii) positioning the suspended living poultry at a positioning location downwardly with respect to the suspending;
   (iii) imparting relative vertical movement between the positioning location and the suspended living poultry, thereby confining the upper body portion of the poultry and accommodating the neck of the suspended living poultry with a V-shaped positioning element; and
   (iv) electro-stunning the poultry via the suspended and positioned living poultry head.

2. The method as claimed in claim 1, wherein the wings of the suspended poultry are confined.

3. The method as claimed in claim 2, wherein the wings of the poultry are confined during the positioning of the suspended poultry head.

4. The method as claimed in claim 1, wherein the poultry stunning comprises electro-stunning.

5. The method as claimed in claim 1, wherein head resistance of the poultry is measured and dependent on the measured resistance electrical current is applied.

6. The method as claimed in claim 1, wherein the poultry stunning comprises at least one of the following: head-head stunning, head-leg stunning, head-cloaca stunning, or any combination thereof.

7. The method as claimed in claim 1, wherein the poultry stunning comprises electro-stunning dependent upon the electro conductivity of the poultry.

8. An installation for stunning living poultry, comprising:
   (i) means for suspending living poultry in a downwardly suspended position with the head positioned downwardly and the legs extending upwardly;
   (ii) means for positioning the suspended living poultry, the positioning means being positioned downwardly with respect to the suspending means;
   (iii) means for electro-stunning the living poultry, the electro-stunning means having at least one electrode that is accommodated by the positioning means;
   (iv) means for imparting relative vertical movement between the positioning means and the suspended living poultry, whereby the positioning means confines the upper body portion of the living poultry and comprises a V-shaped positioning element that accommodates the neck of the suspended living poultry; and
   (v) the electrode engages the head of the living poultry that is positioned by the positioning means, and the electro-stunning means stuns the living poultry.

9. The installation as claimed in claim 8, wherein the V-shaped positioning element opens into a positioning throat confinement.

10. The installation as claimed in claim 8, wherein the positioning means comprise positioning arms holding the positioned poultry head in position.

11. The installation as claimed in claim 8, wherein the electrode is contactable with the suspended head of the stunned poultry.

12. The installation according to claim 8, wherein the stunning means comprises at least two electrodes to be placed against the poultry head.

13. The installation as claimed in claim 8, comprising means for wetting the head of the poultry prior to the electro-stunning.

14. The installation according to claim 8, wherein at least the suspensions means and positioning means are incorporated in transport means and are mutually synchronized.

15. The installation as claimed in claim 8, wherein the V-shaped positioning element is at least partially incorporated in a beaker.

16. The installation as claimed in claim 8, further comprising means for measuring the head resistance and means for adjusting the electrical power dependent on the measured head resistance.

17. The installation as claimed in claim 8, wherein the stunning means comprises carrying electrode plates provided with electrode pins and/or spring loaded on an electrode support.

* * * * *